UNITED STATES PATENT OFFICE.

JOHN M. WEISS, OF NEW YORK, N. Y., ASSIGNOR TO THE BARRETT COMPANY, A CORPORATION OF NEW JERSEY.

COMPOSITION OF MATTER CONTAINING BITUMINOUS MATERIAL.

1,340,855.   Specification of Letters Patent.   Patented May 18, 1920.

No Drawing.   Application filed November 8, 1919. Serial No. 336,672.

*To all whom it may concern:*

Be it known that I, JOHN M. WEISS, a citizen of the United States, residing at New York city, in the county of New York and State of New York, have invented certain new and useful Improvements in Composition of Matter Containing Bituminous Material, of which the following is a specification.

This invention relates to the production of compositions of matter in liquid or semi-liquid form, which may be used for a variety of purposes such as road compounds, paints, fuels, saturants, etc.

It relates more specifically to the production of such compositions that contain in large measure as their principal constituents or ingredients the residue from tar distillation, petroleum products, and a small amount of tar acids, phenols, or nuclear hydroxyl derivatives of certain classes of hydrocarbons as will be more fully set forth below.

Heretofore it has been found that when the lighter or more volatile constituents are distilled from coal tar there remains a sticky and viscous residue which is semi-plastic when cold but will not harden at ordinary temperatures. If the distillation is carried still further the residue is commonly known at pitch which becomes solid and brittle when cold but which can be melted by the application of heat, the melting point being dependent upon the extent to which the distillation has been carried. This residue ordinarily contains a certain percentage of so called "free carbon" together with a certain amount of oils, greases, and resins and other hydrocarbons.

This residue or pitch, as the case may be, is only partially soluble in petroleum naphtha or other petroleum products and attempts heretofore made to dissolve such residues or to suspend them therein in such a fine state of subdivision as to prevent settling or separation of the solid and liquid matter have failed. The same difficulty is experienced with coal tar itself. Prolonged trituration, grinding or mixing operations to produce the requisite degree of subdivision is inadequate as the mixture always exhibits a tendency to settle upon standing irrespective of the fineness of the particles produced by mechanical operations.

By this invention compositions containing coal tar or more particularly the bituminous residues from coal tar distillation are produced which exhibit some of the properties of solutions in that there is no tendency to settle and the material appears to be homogeneous throughout its entire extent so far as ordinary methods of observation show. Probably the compositions are really colloidal solutions or suspensions but owing to the opaque character of the compositions it has not been possible to determine whether they exhibit Brownian movement.

In practising this invention coal tar bitumens, which may be the residues above mentioned, are mixed with petroleum products, but preferably with naphtha or similar distillates obtained from petroleum distillation, and to the mixture is added a small amount say from 1 to 10% of a nuclear hydroxyl derivative of the aromatic or cyclic series of hydrocarbon compounds. Various percentages of the nuclear hydroxyl compound are required depending upon the nature and source of the petroleum product. Such a hydroxyl derivative added to the mixture imparts surprising and hitherto unsuspected properties to the composition in that it apparently makes a solution or at least a colloidal suspension of the components which, before the addition of the hydroxyl compound existed merely as a mechanical mixture or suspension. For this purpose it seems to be necessary but sufficient to employ a small percentage of nuclear hydroxyl derivatives or aromatic hydrocarbons. As examples of such compounds may be mentioned carbolic acid (phenol), cresylic acid (cresols) and the higher boiling phenols and tar acids. In this category is also included not only the mono-hydroxy derivatives such as those mentioned above, but also the dihydroxy derivatives such as resorcinol, hydro-quinol, etc., as well as the tri- or other poly-hydroxy derivatives of the aromatic series. In a similar manner, the derivatives such as the alkyl, aryl, halogen, nitro, etc. of these various hydroxyls may be used for the same purpose. So far as applicant knows a hydroxyl and any benzene ring residue may be used to prevent precipitation or separation of the coal tar bitumen from the petroleum product or disperse medium. This of course includes the naphthalene and anthracene series and their derivatives.

As a specific illustration of a particular composition that may be made in accordance with this invention, eight parts by volume of pitch having a melting point of about 100° F. (taken by the cube in air method as described on p. 821, vol. 10, of the *Journal of Industrial and Engineering Chemistry*) may be mixed with two parts of petroleum naphtha and about 2% of cresylic acid added and the whole thoroughly stirred for a few minutes. Other compositions of similar nature consisting of various proportions of the constituents enumerated above may be made in a similar way. The acid or hydroxyl derivative is preferably added to the naphtha and the mixture introduced into the coal tar bitumen which has been rendered sufficiently fluid by the application of heat. The proportions of the ingredients may be varied throughout a wide range and will be largely determined by the use that is to be made of the composition.

The compositions so made may be kept indefinitely without deterioration and may be used for a great variety of purposes in different arts. Since the petroleum solvent or disperse medium is easily evaporated the coal tar bitumen may be deposited in a highly useful form in the arts where it is to be employed. For example, the compositions may be used for sprinkling roads or streets whereupon the surfaces are penetrated to a certain extent, or used integrally as a binder with crushed stone and the evaporation of the solvent leaves a layer of the bitumen so that it serves as a binder, as a waterproofing means and as a dust laying agency. Also, due to the fact that the compositions are in liquid form, they may be used as fuel or as feed for internal combustion motors of Diesel engines.

These compositions are also suitable as paints; coatings for roofings, etc.; for forming layers for electrical insulation purposes; and as saturants for cloth or fabrics and other porous substances.

While the invention has been specifically described in connection with coal tar residues, it is to be understood that the term "tar" includes tar from illuminating gas manufacture, by-products coke oven tar, producer gas tar, water gas tar, blast furnace tar, etc. Instead of using tar residues and petroleum products as above described to produce the compositions, products of uniform mixtures may be obtained which find useful employment in the arts by adding a nuclear hydroxyl body of the cyclic series of hydrocarbons to pitch and a petroleum residue commonly known as oil asphalt, or, pitch or tar itself may be mixed with petroleum fuel oil and the mixture kept as a colloidal suspension with the aid of the nuclear hydroxyl compounds.

I claim:—

1. A composition of matter consisting of tar bitumen, a petroleum product and a compound containing a benzene ring residue with a hydroxyl group attached directly to the nucleus.

2. A composition of matter consisting of tar bitumen, a petroleum naphtha and a compound containing a benzene ring residue with a hydroxyl group attached directly to the nucleus.

3. A composition of matter consisting of tar bitumen, a petroleum product and a tar acid.

4. A composition of matter consisting of tar bitumen, petroleum naphtha and a tar acid.

5. A composition of matter consisting of tar bitumen, petroleum naphtha and cresylic acid.

6. A composition of matter containing a residue from coal tar distillation, a petroleum product and a compound containing a benzene ring residue with a hydroxyl group attached directly to the nucleus.

7. A composition of matter containing a residue from coal tar distillation, a petroleum naphtha and a compound containing a benzene ring residue with a hydroxyl group attached directly to the nucleus.

8. A composition of matter containing a residue from coal tar distillation, a petroleum product and a tar acid.

9. A composition of matter containing a residue from coal tar distillation, a petroleum naphtha and a tar acid.

10. A composition of matter containing a residue from coal tar distillation, a petroleum naphtha and cresylic acid.

11. A composition of matter containing coal tar pitch, petroleum naphtha and cresylic acid.

12. A composition of matter containing about 80 parts of pitch, 20 parts of petroleum naphtha and about 1 to 3 parts of tar acids.

13. A composition of matter containing about 80 parts of coal tar pitch, 20 parts of petroleum naphtha and about 1 to 3 parts of cresylic acid.

14. A composition of matter containing about 80 parts of coal tar pitch of a melting point of from 90° F. to 120° F., 20 parts of petroleum naphtha and about 1 to 3 parts of cresylic acid.

In testimony whereof I affix my signature.

JOHN M. WEISS.